United States Patent [19]

Ando

[11] Patent Number: 4,550,026

[45] Date of Patent: Oct. 29, 1985

[54] METHOD FOR PRESERVING FOOD USING A PRESERVATIVE GAS ATMOSPHERE

[75] Inventor: Hiroshi Ando, Machida, Japan

[73] Assignee: Yosuke Akiba, Tokyo, Japan

[21] Appl. No.: 466,489

[22] Filed: Feb. 15, 1983

[51] Int. Cl.[4] .................... A23B 4/00; A23L 3/34; B65B 31/02
[52] U.S. Cl. .................... 426/316; 426/320; 426/124; 426/398; 422/29; 422/305
[58] Field of Search ............ 426/320, 312, 316, 133, 426/124, 398; 422/29, 32, 28, 305; 252/407; 99/467

[56] References Cited

U.S. PATENT DOCUMENTS

| | | | |
|---|---|---|---|
| 3,346,398 | 10/1967 | Tundermann et al. | 426/320 |
| 3,494,726 | 2/1970 | Barasch | 422/28 |
| 3,533,806 | 10/1970 | Papworth et al. | 422/32 |
| 3,595,665 | 7/1971 | Huitson et al. | 252/407 |
| 3,600,198 | 8/1971 | Gunthier et al. | 252/407 |
| 3,908,031 | 9/1975 | Wistreich et al. | 426/320 |
| 3,939,971 | 2/1976 | Tullis | 426/133 |
| 4,282,179 | 8/1981 | Gunther | 422/28 |
| 4,349,459 | 9/1982 | Romero-Sierra et al. | 252/407 |
| 4,350,709 | 9/1982 | Vidal et al. | 422/28 |
| 4,404,040 | 9/1983 | Wang | 422/28 |
| 4,421,774 | 12/1983 | Vidal et al. | 426/320 |

FOREIGN PATENT DOCUMENTS

| | | | |
|---|---|---|---|
| 18731 | 8/1934 | Australia | 426/320 |
| 102824 | 1/1938 | Australia | 426/320 |
| 110824 | 1/1938 | Australia | 426/133 |
| 699278 | 12/1964 | Canada | 426/320 |
| 54-132247 | 10/1979 | Japan | 426/316 |
| 55-2273 | 1/1980 | Japan | 426/316 |
| 56-140878 | 11/1981 | Japan | 426/133 |
| 56-148271 | 11/1981 | Japan | 426/133 |
| 57-86276 | 5/1982 | Japan | 426/133 |
| 57-79870 | 5/1982 | Japan | 426/133 |
| 57-79869 | 5/1982 | Japan | 426/133 |
| 58-51881 | 3/1983 | Japan | 426/133 |
| 1277874 | 6/1972 | United Kingdom | 426/320 |

*Primary Examiner*—Steven Weinstein
*Attorney, Agent, or Firm*—Poms, Smith, Lande & Rose

[57] ABSTRACT

Food is preserved by placing it in an atmosphere which includes ethanol and one or more volatile aliphatic acids. Suitable volatile aliphatic acids include those aliphatic acids having from 2 to 6 carbon atoms. A liquid mixture consisting essentially of ethanol and from 0.01 to 20 volume percent aliphatic acid(s) is placed in a sealable container for evaporation to provide the preserving atmosphere. Contact between the liquid mixture and food placed within the sealable container is avoided by placing the liquid mixture of ethanol and aliphatic acid(s) on a suitable absorbent or within a suitable liquid impermeable-gas permeable container.

6 Claims, No Drawings

METHOD FOR PRESERVING FOOD USING A PRESERVATIVE GAS ATMOSPHERE

BACKGROUND OF THE INVENTION

The preservation of food has been a principle concern of mankind since the dawn of civilization. During early civilization, food preservation processes developed slowly and were mainly limited to smoking or curing with salt. With the advent of the industrial revolution and the discovery that food spoilage was due to the activity of living organisms such as bacteria, yeast or molds, the art of preserving food developed rapidly.

Present day methods for preserving food include sterilization by heat, refrigeration, drying, pickling and the addition of chemical preservatives. Sterilization by heat is useful since it provides complete destruction of all bacterial life. However, heat sterilization is not well suited for treating heat sensitive food stuffs. Further, heat sterilization does not prevent subsequent attack by bacteria. Preservation of food by refrigeration requires the continued operation of refrigeration systems. Drying of food by processes such as freeze-drying is an effective food preservation process; however, such drying techniques require specialized equipment and are not well suited for many types of foods. The use of chemical preservatives is also a popular food preservation technique since chemical preservatives can be added to many different types of food stuffs and do not require special processing equipment or continuous attention as in freeze-drying or refrigeration. The use of chemical preservatives, however, is undesirable since the chemical adulterants incorporated into the food may be harmful to the human body.

In order to overcome the problems inherent in mixing chemical additives directly into food, processes have been developed in which the food to be preserved is stored in an atmosphere containing gaseous chemical additives which prevent microbial growth without having to be incorporated into the food. One process which as been widely used involves preserving food by storage in an atmosphere of gaseous ethanol. Although the storage of food in an ethanol vapor atmosphere has been found effective in preserving a wide variety of foods, further improvements are necessary especially with regards to preserving high moisture foods, such as fresh meat and fresh fish. In order to completely prevent the growth of microbes in fresh meat and fresh fish, a high concentration of ethanol vapors in the atmosphere surrounding the fish is necessary. As a result, the meat and fish become tainted with the odor of ethanol. Although the partial absorption of ethanol by the meat or fish is not a health hazard, it does produce a bad taste in the meat or fish. It would be desirable to provide a process for preserving high moisture foods in which the amount of ethanol necessary to preserve the food is reduced so that the food will not become tainted.

SUMMARY OF THE INVENTION

In accordance with the present invention, a food preservation method and composition has been discovered which increases the effectiveness of gaseous ethanol as a food preservative. The present invention is based on adding volatile aliphatic acids to the ethanol vapor to increase its preservative effect.

Volatile aliphatic acids such as acetic acid, propionic acid, butyric acid, isobutyric acid, valeric acid, isovaleric and caproic acid are not by themselves effective in preserving food. However, it was discovered that when amounts of these aliphatic acids in levels as low as 0.1 volume percent were added to ethanol to form a liquid mixture, the resulting vapor atmosphere was more effective than ethanol alone in preserving foods. A liquid mixture consisting essentially of ethanol and from 0.1 to 5 volume percent volatile aliphatic acid is preferred for providing optimum food preservation. The liquid mixture may include a combination of one or more of the volatile aliphatic acids with ethanol.

In accordance with the present invention, the liquid mixture of ethanol and volatile aliphatic acid(s) is either absorbed onto a suitable absorbent and placed in a vapor permeable bag or placed as a liquid in a suitable receptacle or container designed to contain the liquid while allowing the escape of vaporous ethanol and aliphatic acid(s). The liquid mixture absorbent or container is then placed within a suitable closed food preservation vessel where the liquid mixture is allowed to vaporize to provide an atmosphere of ethanol and aliphatic acid(s). In this way, food which is placed within the preservation vessel is exposed to the preserving atmosphere while direct contact with the liquid mixture is avoided.

The above discussed and many other features and attendant advantages of the present invention will become apparent as the invention becomes better understood by reference to the following detailed description.

DESCRIPTION OF THE INVENTION

The present invention may be used to preserve a wide variety of foods including, fresh meat and fish, breads, cakes, vegetables and fruits. The foods may either be processed or non-processed. The invention is especially well suited for preserving foods with high moisture levels such as fresh meat and fish. The food preservation method basically involves placing the food to be preserved in an atmosphere including gaseous ethanol and one or more volatile aliphatic acids. Although many different means may be used to provide the desired gaseous preserving atmosphere, it is preferred that the atmosphere be generated by placing a liquid mixture of ethanol and volatile aliphatic acid in the same closed container with the food to be preserved.

The liquid mixture consists essentially of ethanol and one or more volatile aliphatic acids selected from the group of aliphatic acids having from 2 to 6 carbon atoms. Aliphatic acids included in this group include acetic acid, propionic acid, butyric acid, isobutyric acid, valeric acid, isovaleric acid, and caproic acid. The amount of aliphatic acid added to the ethanol may be varied so long as the concentration of ethanol in the vapor which evaporates from the liquid mixture is equal to or greater than the concentration of aliphatic acid. The liquid mixture will preferably consist essentially of ethanol and from 0.01 to 20 volume percent aliphatic acid. Many of the aliphatic acids used in accordance with this invention have an undesirable odor. Accordingly, it is preferred that the amount of aliphatic acid in the ethanol liquid mixture be 5 volume percent or less. The mixture may include one, two or more different aliphatic acids. For example, a mixture of acetic acid and propionic acid may be used with other mixtures being possible.

The food to be processed is placed within a sealable container or vessel defining a food preservation zone. The liquid mixture as set forth above is placed within the food preservation zone. Direct contact of the ethanol/aliphatic acid liquid mixture with the food should be avoided to prevent tainting of the food. Separation of the liquid mixture from the food may be accomplished by any suitable means. One preferred technique is to place the liquid mixture on a suitable absorbent material such as powders of protein, sugar dextran, cellulose, methylcellulose, ethylcellulose, gelatin, silicon dioxide, acidic aluminum and talc. Any other suitable absorbents which absorb ethanol and volatile aliphatic acids and are also non-toxic may be used. The absorbent, including the absorbed liquid mixture, is then placed within the food preservation zone out of contact with the food. Preferably, the absorbent is placed in some type of container which prevents contact of the absorbent with the food while including sufficient gas permeable openings to allow vaporization of the liquid mixture to form the preserving atmosphere of gaseous ethanol and aliphatic acid(s) in the preservation zone. Suitable containers include any number of plastic bags or containers having a plurality of small holes to allow passage of ethanol and aliphatic acid vapors therethrough.

Instead of containing the ethanol/aliphatic acid(s) liquid mixture on absorbent materials, an alternate exemplary technique is to place the liquid mixture into a glass, plastic or ceramic receptacle which has openings in the vessel above the liquid surface to permit vapors to escape into the preservation zone. This type of liquid mixture containment is not desirable in situations where the preservation container is subjected to rough handling, being turned upside down or any situation where the liquid mixture may be splashed or poured out through the holes in the container. It is important that the liquid mixture of ethanol and volatile aliphatic acid(s) does not come in contact with the food since undesirable changes in taste, flavor, color, pH and deterioration of food quality is possible. The total amount of liquid mixture and the relative portions of the ethanol and aliphatic acid(s) may be varied to provide different degrees of preservation for different food stuffs.

The amount of liquid mixture introduced into a particular food preservation zone will depend upon the type of food being preserved, the degree of preservation desired, the temperature of the preservation zone and other factors. Preferably, the concentration of ethanol and aliphatic acid(s) in the preservation atmosphere will be high enough to provide optimum food preservation while not being so high as to taint the particular food stuff being treated.

Examples demonstrating the present invention are as follows:

EXAMPLE 1—Preserving Raw Tuna

A piece of red raw tuna was sliced into 10 pieces, each weighing 50 grams. Each piece was placed on a plastic dish (12 cm in diameter) and put inside a polyethylene bag (0.03 cm in thickness; 28 cm × 42 cm). Each one was marked with sample numbers from one to ten. The liquid ingredients described in Table 1 were absorbed to cotton (adsorbent) and placed in bags made of rice paper covered with perforated polyethylene (5 cm × 6 cm; weighing 0.21 grams) and heat-sealed, and then afixed with double faced tape to the inside of the polyethylene bags containing the tuna. Each of the polyethylene bags with about 500 milliliter of air was closed and bound with a rubber band and left inside an isothermal unit at a constant temperature of 37° C. Table 2 shows changes on the surface of the tuna for each sample as observed on a daily basis.

TABLE 1

| Liquid Ingredients (ml) | Sample Number | | | | | | | | | |
|---|---|---|---|---|---|---|---|---|---|---|
| | 1 | 2 | 3 | 4 | 5 | 6 | 7 | 8 | 9 | 10 |
| Ethanol | 1 | 1 | 1 | 1 | 1 | 1 | 1 | 1 | 1 | — |
| Acetic Acid | — | 0.01 | 0.005 | — | — | — | — | — | 0.005 | — |
| Propionic Acid | — | — | — | 0.01 | 0.005 | — | — | — | 0.005 | — |
| Butyric Acid | — | — | — | — | — | 0.005 | — | — | — | — |
| Valeric Acid | — | — | — | — | — | — | 0.005 | — | — | — |
| Caproic Acid | — | — | — | — | — | — | — | 0.005 | — | — |

TABLE 2

| No. of Days | Sample Number | | | | | | | | | |
|---|---|---|---|---|---|---|---|---|---|---|
| | 1 | 2 | 3 | 4 | 5 | 6 | 7 | 8 | 9 | 10 |
| 1 | — | — | — | — | — | — | — | — | — | + |
| | 6.4 | 6.4 | 6.4 | 6.4 | 6.4 | 6.4 | 6.4 | 6.4 | 6.4 | 6.2 |
| 2 | — | — | — | — | — | — | — | — | — | ++ |
| | 6.4 | 6.4 | 6.4 | 6.4 | 6.4 | 6.4 | 6.4 | 6.4 | 6.4 | 6.7 |
| 3 | + | — | — | — | — | — | — | — | — | |
| | 6.2 | 6.4 | 6.4 | 6.4 | 6.4 | 6.4 | 6.4 | 6.4 | 6.4 | |
| 4 | ++ | — | + | — | + | + | + | + | — | |
| | 6.7 | 6.4 | 6.1 | 6.4 | 6.1 | 6.1 | 6.2 | 6.2 | 6.4 | |
| 5 | | — | ++ | — | + | ++ | + | ++ | — | |
| | | 6.1 | 6.7 | 6.3 | 6.2 | 6.8 | 6.2 | 6.8 | 6.4 | |
| 6 | | + | | + | ++ | | ++ | | + | |
| | | 6.9 | | 6.1 | 6.8 | | 6.8 | | 6.2 | |
| 7 | | | | ++ | | | | | ++ | |
| | | | | 6.7 | | | | | 6.7 | |

The symbols in each column in Table 2 indicate the surface conditions of the fish as follows:
—: No change
+: Occurance of stickiness
++: Occurance of stickiness and growth of microbes
The numbers below each symbol indicate pH level on the surface of the fish.

Data in Table 2 clearly indicate that the combination of the ethanol gas with any of the volatile aliphatic acid gases (Samples 2-9) is more effective than the ethanol gas only (Sample 1). The difference in one day is quite significant considering raw tuna being left under 37° C.

temperature. The data in Table 2 also shows that the volatile aliphatic acid gas does not affect the pH level of the fish.

EXAMPLE 2—Preserving Raw Tuna 14 pieces of red raw tuna, each weighing 50 grams were tested with ethanol and propionic acid as the volatile aliphatic acid under the same preparations and conditions as in Example 1. The concentrations of the ethanol and propionic acid for the 14 samples are listed in Table 3. The results are shown in Table 4.

TABLE 3

| Sample No. | Liquid Ingredients | |
|---|---|---|
| | Ethanol (ml) | Propionic Acid (ml) |
| 1 | 1 | — |
| 2 | 1 | 2.0 |
| 3 | 1 | 1.0 |
| 4 | 1 | 0.1 |
| 5 | 1 | 0.01 |
| 6 | 1 | 0.001 |
| 7 | 1 | 0.0001 |
| 8 | — | 2.0 |
| 9 | — | 1.0 |
| 10 | — | 0.1 |
| 11 | — | 0.01 |
| 12 | — | 0.001 |
| 13 | — | 0.0001 |
| 14 | — | — |

TABLE 4

| No. of Days | Sample Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| 1 | — | — | — | — | — | — | — | — | — | — | — | + | + | + |
| 2 | — | — | — | — | — | — | — | + | + | + | + | ++ | ++ | ++ |
| 3 | + | — | — | — | — | — | + | + | + | + | ++ | | | |
| 4 | ++ | — | — | — | — | — | + | ++ | ++ | ++ | | | | |
| 5 | + | — | — | — | — | — | ++ | | | | | | | |
| 6 | ++ | — | — | + | + | | | | | | | | | |
| 7 | | + | + | ++ | ++ | | | | | | | | | |
| 8 | | ++ | ++ | | | | | | | | | | | |

The data in Table 4 shows that the combination of ethanol and volatile aliphatic acid (propionic acid in this example) has a synergistic effect on the preservation of food. As little as 0.01% volume of propionic acid in ethanol (Sample 7; Table 4) was more effective against microbial growth than ethanol alone (Sample 1, Table 4). When the amount of propionic acid in the mixture was increased (Sample 2, Table 4) to more than that of ethanol, the preservative effect of the mixture decreased as compared to mixtures having equal amounts of propionic acid and ethanol or less propionic acid than ethanol (Samples 3, 4, 5, and 6). The reason for this phenomenon may be the suppressed vaporization of ethanol. The same phenomena was observed when other types of aliphatic acids were used.

EXAMPLES 3—Bread

Each of 10 bread slices (8 slices to a pound) was placed in a polyethylene bag (0.03 mm in thickness; 28 cm × 42 cm) and numbered from one to ten. The liquid ingredients set forth in Table 5 were adsorbed to 0.5 grams of powdered silicon dioxide (adsorbent) and placed in bags (5 cm × 6 cm; 0.21 grams of weight) made of rice paper covered with perforated polyethylene. Then the bags were heat-sealed and were affixed with double faced tape to the inside of the polyethylene bags containing bread slices. Each of polyethylene bags which contained about 500 milliliters of air was closed and bound with a rubber band and left inside an isothermal unit at a constant temperature of 25° C.

In this test, a reduced amount of liquid mixture was used due to the fact that the growth of mold would not take place for an extremely long period of time if the same amount of liquid mixture had been used as was used in Examples 1 and 2. The results of Example 3 are shown in Table 6.

TABLE 5

| Liquid Ingredients (ml) | Sample Number | | | | | | | | | |
|---|---|---|---|---|---|---|---|---|---|---|
| | 1 | 2 | 3 | 4 | 5 | 6 | 7 | 8 | 9 | 10 |
| Ethanol | 0.1 | 0.1 | 0.1 | 0.1 | 0.1 | 0.1 | 0.1 | 0.1 | 0.1 | — |
| Acetic Acid | — | 0.001 | 0.0005 | — | — | — | — | — | 0.005 | — |
| Propionic Acid | — | — | — | 0.001 | 0.0005 | — | — | — | 0.005 | — |
| Butyric Acid | — | — | — | — | — | 0.0005 | — | — | — | — |
| Valeric Acid | — | — | — | — | — | — | 0.0005 | — | — | — |
| Caproic Acid | — | — | — | — | — | — | — | 0.005 | — | — |

TABLE 6

| Months | Sample Numbers | | | | | | | | | |
|---|---|---|---|---|---|---|---|---|---|---|
| | 1 | 2 | 3 | 4 | 5 | 6 | 7 | 8 | 9 | 10 |
| 1 | — | — | — | — | — | — | — | — | — | ++ (3 days) |
| 2 | — | — | — | — | — | — | — | — | — | |
| 3 | + | — | — | — | — | — | — | — | — | |
| 4 | + | — | + | — | — | — | — | + | — | |
| 5 | ++ | + | + | — | — | + | + | + | — | |
| 6 | | + | + | + | + | + | + | + | — | |

The symbols used in Table 6 mean:
—: No change
+: Scattered mold growth
++: Mold growth on the whole surface

EXAMPLE 4—Preserving Raw Tuna

A piece of red raw tuna was sliced into 2 pieces, each weighing 50 grams. Each piece was placed on a plastic dish (12 cm in diameter) and put inside a polyethylene bag (0.03 cm in thickness: 28 cm × 42 cm). One was kept without preservative and other was kept with 1 milliliter of ethanol and 0.01 milliliter of acetic acid contained in a plastic square container (2 cm × 2 cm × 2 cm) which was then taped to the plastic dish to avoid a spill. Each of the polyethylene bags with 500 milliliter of air was closed and bound with a rubber band and kept inside an isothermal unit at a constant temperature of 37° C. The surface condition of the fish was observed on a daily basis. The results of Example 4 are shown in Table 7.

TABLE 7

| No. of Days | Ethanol and Acetic Acid | No Preservative |
| --- | --- | --- |
| 1 | — | + |
| 2 | — | ++ |
| >5 | + | |
| 6 | ++ | |

The symbols used in Table 7 signify:
—: No change
+: Occurance of stickiness
++: Occurance of stickiness and scattered microbial growth Table 7 shows that the liquid mixture of ethanol and aliphatic acid when maintained as a liquid reservoir in a container is as effective as that of the liquid mixture when it is adsorbed onto an adsorbent (Example 1).

EXAMPLE 5—Preventing the Emergence of Rice Weevils (Ittenkokuga) in Rice Bran

Commercially sold rice bran, each weighing 50 grams, were put in two separate polyethylene bags (0.03 mm in thickness: 28 cm×42 cm). Then twenty larvae of rice weevils (Ittenkokuga) collected from a farmer's storehouse in Isehara City, Japan were placed into both bags. One was kept without preservatives and the other was given preservatives as follows: 2 milliliters of ethanol and 0.02 milliliter of butyric acid were adsorbed in 2 grams of powdered silicon dioxide (adsorbent) and put in a bag made of rice paper covered with perforated polyethylene (6 cm×9 cm). The bag was then heat-sealed and afixed with double faced tape to the inside of the polyethylene bag. Each bag which contained about 50 milliliters of air was closed and bound with a rubber band and kept in an isothermal unit at a constant temperature of 28° C. In the control bag, 17 larvae became insects 8 days later but no insects were found even 6 months later in the other bag with preservatives.

EXAMPLE 6—Preserving Rice Cakes 5 pieces of sliced rice cakes (6 cm×5 cm×1 cm) were bought at retail. Each one was put in a polyethylene bag (0.03 mm in thickness: 28 cm×42 cm) and numbered from 1 to 5. Separately, the liquid ingredients as set forth in Table 8 were adsorbed to 0.5 grams of powdered silicon dioxide (adsorbent) and placed in bags (5 cm×6 cm: 0.21 grams of weight) made of rice paper covered with perforated polyethylene. The bags were heat-sealed and afixed with double faced tape to the inside of the polyethylene bags containing rice cakes. All of the polyethylene bags were closed holding about 500 milliliters of air and bound with rubber bands and placed in an isothermal unit at a constant temperature of 25° C. The results of Example 6 are shown in Table 9.

TABLE 8

| Liquid Ingredients (ml) | Sample Number | | | | |
| --- | --- | --- | --- | --- | --- |
| | 1 | 2 | 3 | 4 | 5 |
| Ethanol | 1 | 1 | 1 | 1 | — |
| Acetic Acid | — | 0.001 | 0.01 | — | — |
| Propionic Acid | — | — | — | 0.01 | — |

The results of Example 6 are shown in Table 9.

TABLE 9

| Number of Days | Sample Number | | | | |
| --- | --- | --- | --- | --- | --- |
| | 1 | 2 | 3 | 4 | 5 |
| 5 | — | — | — | — | +(4 days later) |
| 10 | — | — | — | — | ++ |
| 20 | + | — | — | — | |
| 30 | + | — | — | — | |
| 60 | ++ | + | — | — | |
| 90 | | ++ | — | — | |

The symbols in Table 9 have the following meanings:
—: No change
+: Scattered microbial growth
++: Microbial growth on the whole surface The data in Table 9 again shows that the liquid mixtures of ethanol with acetic acid or with propionic acid produce vapor atmospheres which were far more effective in inhibiting microbial growth than ethanol vapor alone.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein.

What is claimed is:

1. A method for preserving food over a period of time comprising the steps of:
    placing a liquid mixture into a closed vessel defining a food preservation zone, said liquid mixture consisting essentially of a mixture of ethanol and from 0.01 to about 20 volume percent of a volatile aliphatic acid selected from the group consisting of acetic acid, propionic acid, butyric acid, isobutyric acid, valeric acid, isovaleric acid and caproic acid;
    continually vaporizing at least a portion of said liquid mixture in said food preservation zone during said period of time to form an atmosphere in said zone having a food preservative effective amount of said liquid mixture vaporized therein; and
    placing said food into said food preservation zone in contact with said atmosphere, but not in direct contact with said liquid mixture, said food being left in said food preservation zone during said period of time to provide preservation of said food over said period of time.

2. A method according to claim 1 wherein said liquid mixture contains from about 0.1 to about 5.0 volume percent aliphatic acid.

3. A method according to claim 1 wherein said liquid mixture is maintained as a well defined liquid in said food preservation zone by placing said liquid mixture on a compatible absorbent.

4. A method according to claim 3 wherein said absorbent is selected from the group consisting of protein powders, sugar, dextran, cellulose, methycellulose, ethylcellulose, gelatin, silicon dioxide, acidic aluminum and talc.

5. A method according to claim 1 wherein said atmosphere contains more than one aliphatic acid.

6. A method according to claim 5 wherein said atmosphere includes propionic acid and acetic acid vapors.

* * * * *